(12) United States Patent
Takeshima et al.

(10) Patent No.: US 7,608,559 B2
(45) Date of Patent: Oct. 27, 2009

(54) METHOD FOR PRODUCING HEAT-RESISTING COMPOUND OXIDES

(75) Inventors: Shinichi Takeshima, Numazu (JP); Akio Koyama, Yokohama (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/918,545

(22) PCT Filed: Apr. 7, 2006

(86) PCT No.: PCT/JP2006/307877

§ 371 (c)(1),
(2), (4) Date: Oct. 15, 2007

(87) PCT Pub. No.: WO2006/112374

PCT Pub. Date: Oct. 26, 2006

(65) Prior Publication Data

US 2009/0029851 A1   Jan. 29, 2009

(30) Foreign Application Priority Data

Apr. 18, 2005 (JP) ............................... 2005-120331

(51) Int. Cl.
*B01J 23/10* (2006.01)
(52) U.S. Cl. ..................................................... 502/304
(58) Field of Classification Search ................. 502/100, 502/300, 304
See application file for complete search history.

(56) References Cited

U.S. PATENT DOCUMENTS

| 4,206,186 A | 6/1980 | Hölter et al. |
| 5,242,674 A | 9/1993 | Bruno et al. |

(Continued)

FOREIGN PATENT DOCUMENTS

EP          1 415 956 A2      5/2004

(Continued)

OTHER PUBLICATIONS

Masui, T. "Characterization and Catalytic Properties of $CeO_2$-$ZrO_2$ Ultrafine Particles Prepared by the Microemulsion Method," *Journal of Alloys and Compounds*, vol. 269, pp. 116-122 (1998).

(Continued)

*Primary Examiner*—Melvin C Mayes
*Assistant Examiner*—Michael Forrest
(74) *Attorney, Agent, or Firm*—Oliff & Berridge, PLC

(57) ABSTRACT

A method for producing a heat-resisting compound oxide in which oxide particles are made to carry fine particles having a smaller particle diameter than that of said oxide particles. Said oxide particles or their precursor particles are charged to a potential inverse to that of said fine particles or their precursor particles so that said oxide particles adsorb said fine particles, and are then sintered to carry said fine particles. Thus, the fine particles can be homogeneously dispersed and firmly adhered to the surfaces of the oxide particles. As a result, the compound oxide is so excellent in heat resistance that it has little change, even subjected to a treatment such as a sintering, in the structure of the oxide particles for a carrier or in the adsorption state of the ultrafine particles, and has little thermal deterioration.

9 Claims, 6 Drawing Sheets

U.S. PATENT DOCUMENTS

| | | | |
|---|---|---|---|
| 5,254,797 A | 10/1993 | Imoto et al. | |
| 5,753,581 A * | 5/1998 | Beckmeyer et al. | 502/304 |
| 6,083,467 A | 7/2000 | Takeshima et al. | |
| 6,276,132 B1 | 8/2001 | Kanesaka et al. | |
| 6,753,351 B2 * | 6/2004 | Clark et al. | 518/700 |
| 7,294,604 B2 | 11/2007 | Dath et al. | |
| 2003/0109588 A1 | 6/2003 | Schmidt et al. | |
| 2004/0087440 A1 | 5/2004 | Kuno | |
| 2004/0171483 A1 | 9/2004 | Takeshima | |
| 2004/0234439 A1 | 11/2004 | Takeshima et al. | |
| 2005/0014000 A1 | 1/2005 | Bringley et al. | |

FOREIGN PATENT DOCUMENTS

| | | |
|---|---|---|
| EP | 1 452 483 A1 | 9/2004 |
| EP | 1 479 651 A1 | 11/2004 |
| JP | A 5-261287 | 10/1993 |
| JP | A 7-246343 | 9/1995 |
| JP | A 8-17942 | 1/1996 |
| JP | A 2000-197822 | 7/2000 |
| WO | WO 02/094716 A1 | 11/2002 |

OTHER PUBLICATIONS

U.S. Appl. No. 10/786,046, filed Feb. 26, 2004 in the name of Shinich Takeshima.

U.S. Appl. No. 11/542,206, filed Oct. 4, 2006 in the name of Shinichi Takeshima.

U.S. Appl. No. 11/631,174, filed Dec. 29, 2006 in the name of Shinichi Takeshima et al.

New U.S. Patent Application, filed Oct. 15, 2007 in the name of Shinichi Takeshima et al.

* cited by examiner

After Sintering In Air, 800°C × 2h

METHOD FOR PRODUCING HEAT-RESISTING COMPOUND OXIDES

TECHNICAL FIELD

This invention relates to a method for producing a compound oxide to be employed as a catalyst or the like to purify the exhaust gas of an internal combustion engine.

BACKGROUND ART

The compound oxide is an oxide in the form of a compound of two or more kinds of metal oxides, and has no ion of oxo-acid as the unit of a constitution. One important application of the compound oxide is a catalyst and a catalyst carrier. As the catalyst of this kind, there is known a catalyst having such a constitution that catalytically active fine particles are carried on the heat-resisting carrier and used for purifying the exhaust gas of the internal combustion engine.

A variety of methods are known for producing the aforementioned catalytically active fine particles or carriers, and the method for carrying the fine particles on the carrier is described in Japanese Patent Publication No. 08-17942 or Japanese Patent Laid-Open No. 2000-197822.

The aforementioned method described in Japanese Patent Publication No. 08-17942 can be called the water-absorption carriage method. This method comprises: preparing heat-resisting powder carrying a precious metal, a perovskite type compound oxide and a heat-resisting carrier; preparing slurry containing the heat-resisting powder carrying the precious metal and the perovskite type compound oxide; applying the slurry to the heat-resisting carrier; and then drying and sintering the slurry.

On the other hand, the method described in Japanese Patent Laid-Open No. 2000-197822 can be called the impregnation carriage method. This method comprises: adding carrier powder to a solution of salt containing a metal composing a compound oxide; evaporating and drying the solution into a solid; and then sintering the solid.

In either of the methods, however, water-soluble salt such as water-soluble nitrate is dissolved in water and absorbed by the carrier already prepared, and is then dried and sintered. In this process, the carrier may be partially dissolved to have its heat resistance lowered, and the compound oxide obtained may be thermally deteriorated.

DISCLOSURE OF THE INVENTION

This invention has been conceived noting the aforementioned technical problems, and has an object to provide a highly heat-resisting compound oxide by homogeneously dispersing fine particles containing ultrafine particles of a particle diameter smaller than that of oxide particles, when the fine particles are to be carried on the oxide particles, and by adhering the fine particles densely to the oxide particles.

In order to achieve the aforementioned object, this invention relates to a method for producing a heat-resisting compound oxide in which oxide particles are made to carry fine particles having a smaller particle diameter than that of said oxide particles, and the method is characterized in that said oxide particles or their precursor particles are charged to a potential inverse to that of said fine particles or their precursor particles so that said oxide particles adsorb said fine particles, and are then sintered to carry said fine particles.

In the aforementioned method, another method according to this invention is characterized in that said oxide particles or their precursor particles are synthesized in micelles in a microemulsion, and in that a solution containing said fine particles or their precursor particles is mixed with said microemulsion so that said oxide particles are caused to adsorb said fine particles.

In the aforementioned method, still another method according to this invention is characterized in that said fine particles or their precursor particles are synthesized in a reaction field for synthesizing said oxide particles or their precursor particles and are charged to a polarity inverse to that of said oxide particles or their precursor particles so that said oxide particles are caused to adsorb said fine particles.

In any of the aforementioned methods, still another method according to this invention is characterized in that the pH value of either an atmosphere, in which said oxide particles or their precursor particles and said fine particles or their precursor particles are mixed, or an atmosphere, in which said fine particles are synthesized, is adjusted to charge said oxide particles or their precursor particles and said fine particles or their precursor particles to the inverse polarities.

In a method of this invention, still moreover, the adjustment of the surface potential may be made by causing either: said oxide particles or their precursor particles; or said fine particles or their precursor particles to adsorb an acid or a base.

According to this invention, therefore, an electric attractions act between the oxide particles or their precursors (as will be called merely as the oxide particles) and the fine particles or their precursors (as will be called merely as fine particles) so that the fine particles are gradually attracted by the surfaces of the oxide particles. If, in this case, the so-called unabsorbed portions are in the surfaces of the oxide particles, the fine particles are absorbed by the electric actions at those portions so that the fine particles can be homogeneously adsorbed by and carried on the surfaces of the oxide particles. Moreover, these adsorptions can be performed at the procedure of synthesizing the individual particles thereby to suppress the thermal deterioration of the oxide particles to become the carriers. At the same time, the fine particles are stable even if exposed to a high temperature so that their thermal deterioration is suppressed. After all, it is possible to produce the compound oxide which is excellent in the heat resistance in its entirety.

In addition to the effects obtained by the invention of claim 1, according to another method of this invention, in case the oxide particles having the fine particles adhered thereto are sintered, the fine particles on the oxide particles are suppressed in migrations but not covered with the oxide particles. In the case of application to a method for carrying catalytically active components on a carrier, therefore, it is possible to obtain a catalyst excellent in the heat resistance and little in the thermal deterioration.

In addition to the aforementioned effects, according to still another method of the invention, the fine particles are adsorbed, simultaneously as they are synthesized, on the oxide particles by the difference between the potentials so that the fine particles can be adsorbed and carried, while being still fine, by the oxide particles.

In addition to the effects of any of the aforementioned methods, according to still another method of the invention, the potentials of the surfaces of the individual particles can be easily adjusted.

BEST MODE FOR CARRYING OUT THE INVENTION

Figure 1:
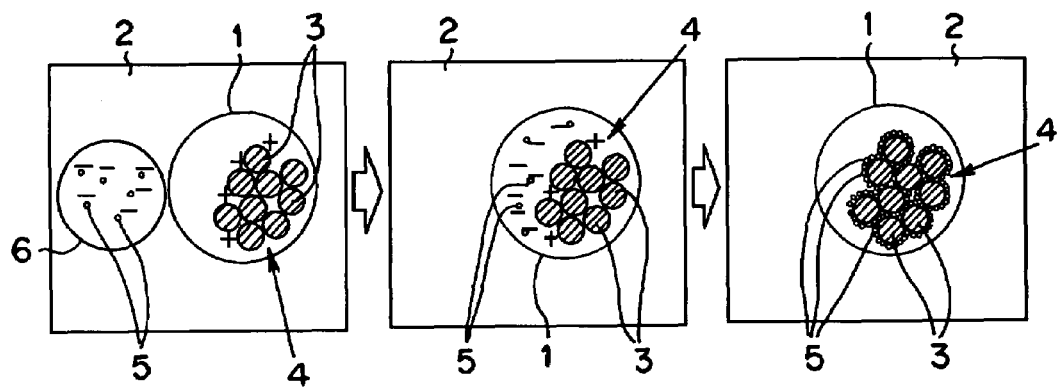
FIG. 1 is a diagram schematically showing a fine particle adsorption process for oxide particles in one example of the method of this invention.

This invention relates to a method for producing a compound oxide, in which fine particles containing ultrafine particles having a smaller diameter than that of oxide particles are carried on the oxide particles. The compound oxide is exemplified by one which can be used as a catalyst for purifying a burned exhaust gas, and its oxide component to act as a carrier is a porous substance having pores of a predetermined diameter. It is preferred that the pores are mesopores having diameters belonging to the so-called mesorange of about 10 to 100 nm.

As the oxide to become the carrier, specifically, there can be adopted zirconia, alumina, silica-alumina, a lanthanum-yttrium-zirconium compound oxide, a lanthanum-zirconium compound oxide, a cerium-zirconium-group oxide, an alumina-group compound oxide, a titania-group compound oxide, a silica-group compound oxide or the like. The particles of this oxide have such a porous structure as is obtained, for example, by causing secondary particles of an agglomeration of primary particles produced by a hydrolysis to further agglomerate.

The method for producing the porous structure may be exemplified by one known in the prior art, but may otherwise be preferably exemplified by the microemulsion method utilizing a microemulsion, in which micelles (or inverse micelles) having an aqueous phase inside are dispersed in an organic solvent (i.e., oil). This is specifically explained in the following. At first, the primary particles of the first oxide for the carrier are produced and are made to agglomerate to produce the secondary particles, and these secondary particles are made to agglomerate to each other. However, the agglomeration of the secondary particles is suppressed till the secondary particles grow to a size of some extent. In order to suppress the fusion (or coalescence) of the inverse micelles till the secondary particles grow, there can be adopted a method for enlarging the spacing between the inverse micelles by lowering the density of the aqueous phase (or by raising the density of the oil), a method for suppressing the fusion (or coalescence) of the inverse micelles with electric repulsions by raising the concentration of cations (excepting hydrogen ions) in the inverse micelles, and so on.

In case the compound oxide is to be produced by the microemulsion method, a solution, which is prepared by dissolving a compound of a first metallic element hydrolyzed to make a hydroxide or an oxide in an organic solvent, and an emulsion, which contains ions of second and subsequent metallic elements in an aqueous phase inside of the inverse micelles made by a surfactant in an organic solvent, are mixed with each other to hydrolyze the compound of the first metallic element in the interfaces of the inverse micelles and to introduce the second and subsequent metallic elements thereby to condense and polymerize the primary particles of a precursor of the compound oxide.

If the compound of the metallic element, which is hydrolyzed to make the hydroxide, is called the metallic compound, the metal to make the metallic compound means not a metal in a narrow sense but generally an element M capable of making an M-O-M bond.

As this metallic compound, it is possible to employ the metallic compound which is generally used in the so-called sol-gel method. This metallic compound can be exemplified by a metal alkoxide, an acetylaceton metallic complex, metal carboxylate, a metallic inorganic compound (e.g., nitrate, oxychloride or chloride), or the like.

The metallic element M to make metallic alkoxide involves elements of the first group to the fourteenth group, sulfur, selenium and tellurium of the sixteenth group, and phosphorous, arsenic, antimony and bismuth of the fifteenth group. Here, it is said that the platinum-group elements or some lanthanide elements do not make the alkoxides. For example, the silicon alkoxide or the germanium alkoxide are called the metal alkoxide. The metal alkoxide is easily available, because various alkoxides are sold on the market and because their producing method is well known in the art.

The hydrolyses of metallic alkoxides $M(OR)_n$ (wherein: M designates a metal; and R designates an alkyl radical such as methyl, ethyl, propyl or butyl) are also known, and are formally expressed by:

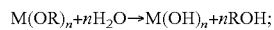

and then

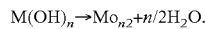

The hydrolyses of acetylaceton metal complex $(CH_3COCH_2COCH_3)_nM$ (wherein M designates a metal), and is expressed by:

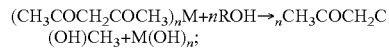

and then

The acetylaceton metal complex is easily available, because various metal complexes are sold on the market and because their producing method is well known in the art. The acetylaceton metal complex is represented by aluminum acetonate, barium acetonate, lanthanum acetonate, platinum acetonate or the like, and has more kinds than those of alkoxides.

The organic metallic compound such as the metal alkoxide or the acetylaceton metallic compound is easily dissolved by selecting a proper solvent from alcohol, a polar organic solvent or a hydrocarbon solvent. It is preferred that a hydrophobic (or oily) organic solvent to be separated into two phases from the aqueous phase is used as the solvent of this invention.

The organic solvent is exemplified by hydrocarbons such as cyclohexane or benzene, straight-chain alcohol such as hexanol, ketone such as acetone and so on. The standards for selecting the organic solvent involve not only the solution of the surfactant but also the area for forming microemulsion (i.e., the magnitude of the molar ratio of water to surfactant).

It is known that the hydrolytic reaction of the organic metallic compound starts and proceeds when water is added to an organic phase, in which a compound of a metallic element hydrolyzed to produce a hydroxide or oxide is dissolved. Generally, the metallic hydroxide or metallic oxide can be obtained by adding water to the organic phase having the metallic compound dissolved therein and by agitating the organic phase.

In case the compound oxide is to be produced by the microemulsion method, there is formed a water-in-oil type emulsion which contains the ions of the second and subsequent ions in the aqueous phase of the inverse micelles dispersed finely with the surfactant in the organic phase. This emulsion is caused, when the solution of the first metallic compound is added to and mixed with the emulsion by mixing it, to react with the ions of the second and subsequent metallic elements so that it is hydrolyzed. According to this method, it is thought that the fine particles can be obtained because the inverse micelles act as reaction nuclei or because the surfactant stabilizes the fine particles of the hydroxide produced.

In the aforementioned hydrolytic reaction, it is also known that a plurality of metallic compounds are hydrolyzed, when made to contact with water, by dissolving the metallic compounds in the organic phase, so that a plurality of metallic hydroxides are simultaneously produced.

In this invention, one kind (involving the first element) of the hydrolytic metallic compounds is made to exist in the organic phase, and the second metallic element and the third and subsequent metallic elements are made to exist as ions in the aqueous phase in the inverse micelles when the organic phase and the aqueous phase contact with each other.

The existence of the ions in the aqueous phase can be caused by using water-soluble metallic salts, especially inorganic salts such as nitrate or chloride, and organic salts such as acetate, lactate or oxalate. The ions of the second element existing in the aqueous solution may be not only single ions but also complex ions containing the second element. The ions may also be those of the third and subsequent ones.

When the organic phase and the aqueous phase are brought into contact, the organic metallic compounds in the organic phase come into contact with so that they cause the hydrolytic reactions to produce the hydroxides or oxides the metal. In the microemulsion method, it has been found that the ions of the metal existing in the aqueous phase are incorporated into the hydroxide (or oxide) of the aforementioned metal or the hydrolyzed product. This phenomenon is not known in the prior art. The reason why the ions in the aqueous phase are incorporated into the hydroxides even without any special sedimentation is not sufficiently clarified yet, but is described on the case, in which the metallic compound is alkoxide. It is thought that, when the alkoxide is hydrolyzed, other metallic ions in the aqueous phase induce alkoxide so that the hydrolysis advances, or that the fine hydroxides of the alkoxide hydrolyzed trap and agglomerate the metallic ions of a predetermined quantity in the aqueous phase.

In the aforementioned method, it is preferred that the reaction system is the water-in-oil type emulsion system or the microemulsion system. In this case, it is thought that the method can attain a high hydrolyzing rate firstly due to an extremely small diameter of several nm to several tens nm of the inverse micelles and a remarkably large area (about 8,000 $m^2$/litter in the case of the diameter of 10 nm) of the interface between the organic phase, the aqueous phase, and a homogenization effect secondly due to the fact that the aqueous phase is finely dispersed so that metallic ions of an extremely small number (about 100 ions) are contained each inverse micelle.

On the other hand, the aqueous phase in the inverse micelles is the so-called reaction field to cause the production of the primary particles, the production of the secondary particles due to the agglomeration of the primary particles and the mutual agglomeration of the secondary particles. Therefore, the size of the inverse micelles influences the pores to be formed when the secondary particles agglomerate and the pore structure of the compound oxides due to the agglomeration. Considering this point, it is preferred in this invention that the diameter of the aqueous phase of the inverse micelles is preferred to be 20 nm or more.

The method for producing the emulsion group or the microemulsion group of the water-in-oil type is known. As the organic phase medium, there can be employed hydrocarbons such as cyclohexane or benzene, straight-chain alcohol such as hexanol, ketone such as acetone, or the like similar to the aforementioned organic solvents. The surfactant to be used in this invention extends over various kinds such as a nonionic-group surfactant, an anion-group surfactant or a cation-group surfactant, and can be employed in combination with the organic phase components conforming to the applications.

As the surfactant of the nonionic group, there can be used a polyoxyethylene ethylene nonylphenyl ether group represented by polyoxyethylene (n=5) nonylphenyl ether, a polyoxyethylene octylphenyl ether group represented by polyoxyethylene (n=10) octylphenyl ether, a polyoxyethylene alkylether group surfactant represented by polyoxyethylene (n=7) cetylether, and a polyoxyethylene sorbitan group surfactant represented by polyoxyethylene sorbitan trioleate.

The anion-group surfactant can be exemplified by di-2-ethylene hexylsulfur sodium succinate, and the cation-group surfactant can be exemplified by cetyl trimethyl ammonium chloride or cetyl trimethyl ammonium bromide.

In case a compound oxide of three or more elements is to be produced, according to the invention, the third and subsequent elements are made to exist in the aqueous phase in the inverse micelles. This is because a plurality of hydrolytic metallic compounds are different, if any in an organic phase, in stability in the organic phase so, that the products are heterogeneous. Despite of this phenomenon, however, the aforementioned metal element and others have to be homogeneous, but the metallic compound of the third element may exist in the organic phase if the homogeneity between that metallic element and the third metallic element is not important.

The inverse micelles of said other metallic element can be produced by an injection method, in which the aforementioned surfactant is dissolved in the aforementioned organic phase medium, and in which aqueous solution containing the ions of another metallic element is added to the solution and agitated.

Thus, the solution of the aforementioned metallic compound and the inverse micelles containing the ions of that another metallic element in the aqueous phase are made to contact so that the primary particles of the precursor of the oxide particles (or the compound oxide) to become such a carrier of the invention as contains the aforementioned metallic element and another metallic element are formed by hydrolysis. After this, the system containing those primary particles is left aside to age for a predetermined time period (e.g., two hours) at a predetermined temperature (e.g., 30° C. to 80° C.). In the inverse micelles, the secondary particles are formed for a relatively short time period and are agglomerated at the aging step. At this time, all the primary particles are agglomerated to form not the large secondary particles but relatively small secondary particles and then pores of sufficient sizes between the secondary particles so that the hydrolysis may proceed to agglomerate the secondary particles while preventing or suppressing the fusion (or coalescence) and so that the primary particles and the secondary particles may age.

According to the method of this invention, on the other hand, the secondary particles thus synthesized are used as the oxide particles to act as the carrier. These oxide particles are caused to adsorb the fine particles of the second oxide particles, and are sintered to carry the fine particles. These fine particles can be called the ultrafine particles having smaller diameters (e.g., several nm) than those of the first oxide particles. In this invention, the second oxide particles can be exemplified by a tungsten oxide, a fluorite type lanthanum-cerium zirconia compound oxide, a perovskite type lanthanum-iron compound oxide, a lanthanum-manganese compound oxide or the like. These second oxide particles or their precursors (as both of them may be called the fine particles or ultrafine particles) may be mixed with the aforementioned first oxide particles or their precursors (as both of them may be called the first oxide particles) synthesized in advance, and may be adsorbed by the first oxide particles. Alternatively, the fine particles as the second oxide particles may also be produced in the reaction field, where the aforementioned first oxide particles to become the carrier are synthesized, so that they may be adsorbed by the first oxide particles simultaneously as they are synthesized.

The method of this invention is characterized in the method for adsorbing the aforementioned fine particles in the oxide particles to become the carrier. In the method of this invention, more specifically, the potentials (or the zeta-potentials) of the surfaces of the individual particles are adjusted to the potentials inverse to each other so that the fine particles are adsorbed in the surfaces of the oxide particles by the electrically attractive forces. Those potentials can also be adjusted by adjusting the pH or by adsorbing acid or base in advance by the oxide particles or their precursors.

For example, the pH at the time of forming the fine particles is set to a value largely apart from the equipotential point, at which the zeta-potential is zero. The solution containing the particles is mixed into the solution containing the aforementioned first oxide particles to become the carrier. The first oxide particles are synthesized by the microemulsion method, and the solution of the second oxide particles (or the ultrafine particles) is mixed into that microemulsion liquid. Then, the solution of the fine particles is dispersed as the micelles enclosed by the surfactant.

When the micelles containing the oxide particles and the micelles containing fine particles collide to fuse, the solutions in the individual micelles mix with each other, and the individual particles are charged at the inverse potentials. As a result, the second oxide particles or the ultrafine particles are electrically attracted and adsorbed into the surfaces of the first oxide particles. In the surfaces of the first oxide particles, the portions, to which the ultrafine particles adhere, are neutralized, but the remaining portions are left at the predetermined potential. If the ultrafine particles sufficiently exist, therefore, they are adsorbed at substantially all the points in the surfaces of the first oxide particles.

On the other hand: the first metallic oxide is synthesized in the aqueous phase inside of the micelles; the pH of the aqueous phase is adjusted within a predetermined range; and the solution containing the metallic element for producing the fine particles or the second oxide particles is mixed with the microemulsion liquid, so that the second metallic oxide or the hydroxide of the metal is produced by the neutralization reaction in the interface or inside aqueous phase of the micelles having the primary particles of the second metallic oxide and the secondary particles agglomerated from the primary ones. The fine particles of the second metallic oxide or its hydroxide has the potential inverse to that of the first oxide particles so that they are electrically adsorbed, simultaneously as produced, by the surface of the first metallic oxide.

The combination of the first oxide particles and the second oxide particles, which can be charged to the inverse potentials and adsorbed, is exemplified by the first oxide particles to become the carrier, such as an oxide, e.g., zirconia, alumina or silica-alumina, or a compound oxide, e.g., lanthanum zirconia, strontium zirconia or ceria zirconia, and the second oxide particles to be carried, such as a tungsten oxide, a lanthanum-cerium zirconia compound oxide, a perovskite type lanthanum-iron compound oxide or a lanthanum-manganese compound oxide.

Figure 2:
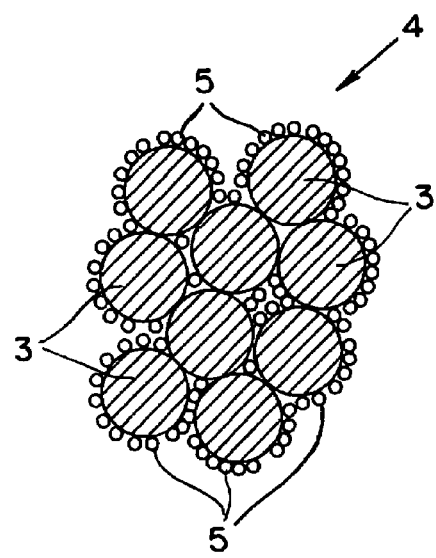
FIG. 2 is a diagram schematically showing the state, in which second oxide particles or ultrafine particles are adsorbed by first oxide particles.
Figure 3:
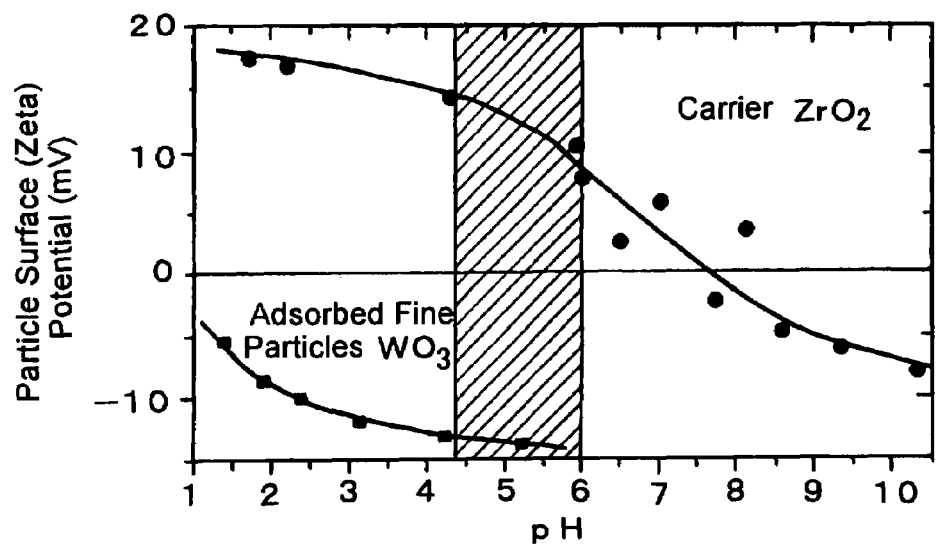
FIG. 3 is a graph plotting relations of the zeta-potentials of zirconia particles for a carrier or their precursor particles and ultrafine particles of a tungsten oxide or their precursors, and pH values.

The aforementioned adsorption process by the microemulsion method is schematically shown in FIG. 1, and the state, in which the second oxide particles are adsorbed by the first oxide particles, is schematically shown in FIG. 2. FIG. 1 shows an example, in which the first oxide particles to become the carrier are prepared by the microemulsion method and in which the second oxide particles or the ultrafine particles are adsorbed by the first oxide particles. Micelles (or inverse micelles) 1 having an aqueous phase therein are dispersed in an organic solvent (e.g., oil). In the aqueous phase inside of the micelles 1, primary particles 3 of a predetermined metal hydroxide or metallic oxide are produced by a hydrolysis and are agglomerated to produce secondary particles 4. These primary particles 3 or secondary particles 4 are the precursors of the aforementioned first oxide particles. Then, the pH of the aqueous phase in the micelles 1 is adjusted to adjust the potential (or the zeta-potential) of the surface of the primary particles 3 or the secondary particles 4. In case the first metallic oxide to become the carrier is zirconia ($ZrO_2$), it is charged to the plus polarity by reducing the pH to about "8" or less, as shown in FIG. 3.

On the other hand, a metallic hydroxide or an oxide to become the precursors of the second oxide particles is produced by a neutralization reaction or a hydrolysis. When an aqueous solution of the metallic oxide and a diluted liquid of an acid are dripped into the aforementioned microemulsion solution, for example, micelles 6 containing ultrafine particles 5 of the metallic hydroxide are produced in the organic solvent 2. Here, the metallic hydroxide ultrafine particles 5 have a particle diameter of several nm and are charged to a minus polarity by adjusting the pH. In case the second oxide particles are a tungsten oxide ($WO_3$), for example, they are negatively charged, if the pH is "1" or higher, as shown in FIG. 3, to have its absolute voltage value increased with the increase in the pH. Therefore, in case the first oxide particles are zirconia whereas the second oxide particles are a tungsten oxide, it is preferred that the pH is set to about "4.5" to "6" so as to enlarge the difference between the potentials.

These micelles 1 and 6 are caused by the Brownian movement or the agitation of the microemulsion to collide against each other and to coalesce (or fuse) into each other. In short, the individual aqueous phases migrate into one another. At the pH value of the aqueous phase thus established, the aforementioned individual particles 3 and 4 or the precursors of the first oxide are charged to the plus polarity whereas the ultrafine particles 5 or the precursors of the second oxide particles are charged to the minus polarity so that both are caused to adsorb each other by the electric forces because their potentials are inverse. In this case, the ultrafine particles 5 are so adsorbed as to bury the portions charged to the plus polarity in the surfaces of the particles 3 and 4 or the precursors of the first oxide particles. As a result, the ultrafine particles 5 can also be densely adsorbed to establish the homogeneous phase, as schematically shown in FIG. 2. The particles 3 and 4 having adsorbed the ultrafine particles 5 thus prepared are sintered after the known rinsing and drying steps into the compound oxide particles or the compound oxide particle powder.

Figure 4:
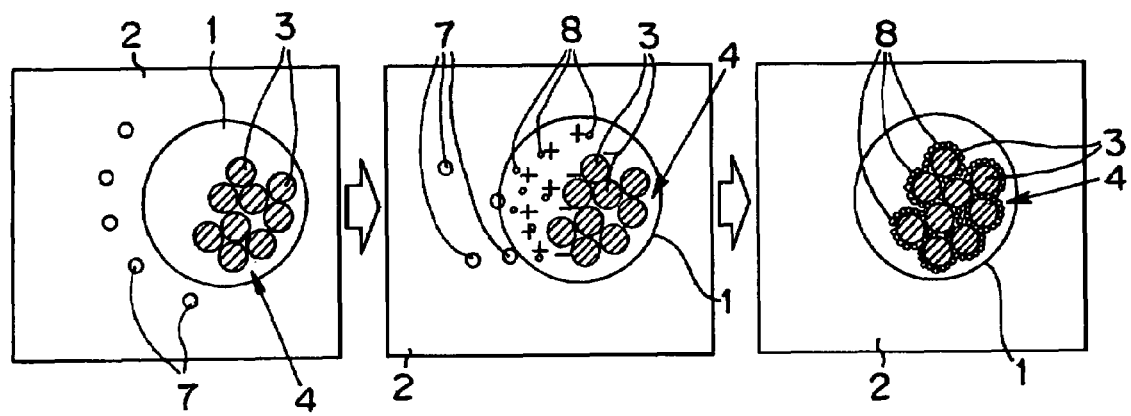
FIG. 4 is a diagram schematically showing another example of the method of this invention and a process for synthesizing and adsorbing fine particles in a reaction field for synthesizing the oxide particles.

Moreover, an example, in which particles are synthesized and adsorbed in a reaction field for synthesizing either oxide particles to become a carrier or their precursors, is schematically shown in FIG. 4. Separately of the microemulsion solution having the aforementioned micelles 1 dispersed in an organic solvent, there is prepared another microemulsion solution, in which a raw liquid for fine particles is dispersed in an organic solvent. As the fine particle raw liquid, there can be exemplified a solution of ammonium metatungstate, a solution of zirconium oxynitrate, a solution of cerium nitrate or the like. A suitable one of these solutions is dispersed in an organic solvent to prepare an O/W type microemulsion solution. When these two microemulsion solutions are mixed, the aforementioned micelles 1 to become a reaction field for synthesizing the oxide particles and another micelles 7 containing the aforementioned fine particle raw liquid as the aqueous phase are dispersed into the organic solvent. By agitating that microemulsion solution and by the Brownian movements of the individual micelles 1 and 7, these micelles 1 and 7 collide to coalesce each other.

In this case, ions (e.g., excessive ammonium ions) for the neutralization reaction of the aforementioned fine particle raw liquid are dissolved in the aqueous phase of one-side micelles 1 or into the reaction field for producing the oxide particles to become the carrier. Then, ultrafine particles 8 to be carried by the carrier or their precursors are produced by the neutralization reaction. The ultrafine particles 8 are charged to the plus polarity whereas the primary particles 3 of a metallic oxide or their agglomerate, i.e., the secondary particles 4 are charged to the minus polarity. Instantaneously of this, the ultrafine particles 8 produced are electrically adsorbed by the secondary particles or their precursors. Thus as in the aforementioned example shown in FIG. 1, the oxide particles thus obtained to have the ultrafine particles 8 adsorbed homogeneously and densely are sintered after the known rinsing and drying steps into the compound oxide particles or the compound oxide particle powder.

The compound oxide thus prepared does not need the step of dissolving the first oxide particles, after formed, to become its carrier so that the first oxide particles constituting the carrier have a strong bonding force. As a result, the compound oxide is hardly deteriorated, even if exposed to a high temperature of about 600 to 900° C., so that it becomes a compound oxide of a high heating resistance. On the other hand, the fine particles or the second oxide particles are adsorbed by the electric attractions onto the surfaces of the first oxide particles to become the carrier, and are subjected in that state to the rinsing, drying and sintering treatments. Therefore, the fine particles are hardly migrated, and accordingly hardly have an offset location or a concentration deviation. In the case of the compound oxide to be employed as the catalyst, therefore, the second active oxide particles can be homogeneously carried to provide a catalyst of an excellent performance.

Especially in the compound oxide which is produced by the aforementioned method according to the invention, the primary particles of the first oxide to become the carrier agglomerate with one another to form the secondary particles. However, the primary particles contact with or fuse into one another partially in their surfaces, but the fine particles of the second oxide are densely adsorbed by the remaining surfaces, as schematically shown in FIG. 2. In the compound oxide is heated to a higher temperature, therefore, the sintering of the primary particles or the secondary particles themselves is blocked or, suppressed by those fine particles. As a result, the surface area of the compound oxide obtained is enlarged.

Figure 5:
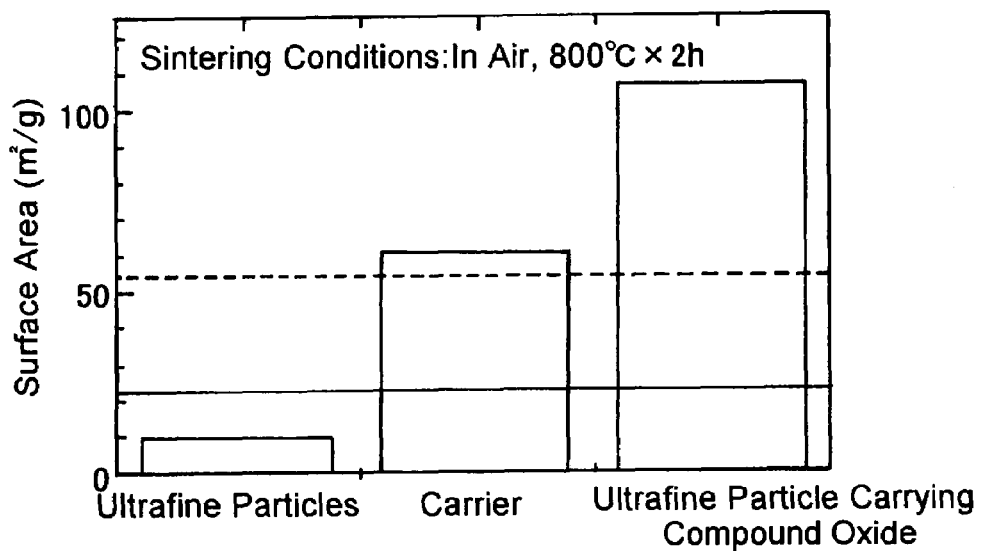
FIG. 5 is a diagram showing the measurement results of the surface areas of the compound oxide obtained by the method of this invention.

FIG. 5 shows the measurement results of the individual surface areas of the case, in which $LaZrO_{3.5}$ is employed as the fine particles and in which $La_{3.5}Y_7Zr_{89.5}Ox$ is employed as the carrier. The surface area designated by a solid line is an average value of the surface area of the compound oxide according to the microemulsion method for synthesizing the carrier by the hydrolysis in the inverse micelles where the ultrafine particles exist, and the surface area designated by a broken line is an average value of the surface area of the compound oxide obtained by the so-called water-absorption carriage method of the prior art. Here, the sintering conditions for the measured values of FIG. 5 are 800° C. and two hours in the air. As apparent from the measurement results shown in FIG. 5, the compound oxide, which is obtained according to the method of this invention by adsorbing the solid state fine particles in the oxide particles to become the carrier and by sintering the fine particles, has a surface area more enlarged than that obtained by the method of the prior art. This enlargement is thought to come from the fact that the sintering of the primary particles or the secondary particles of the oxide is suppressed by the fine particles.

Figure 6:
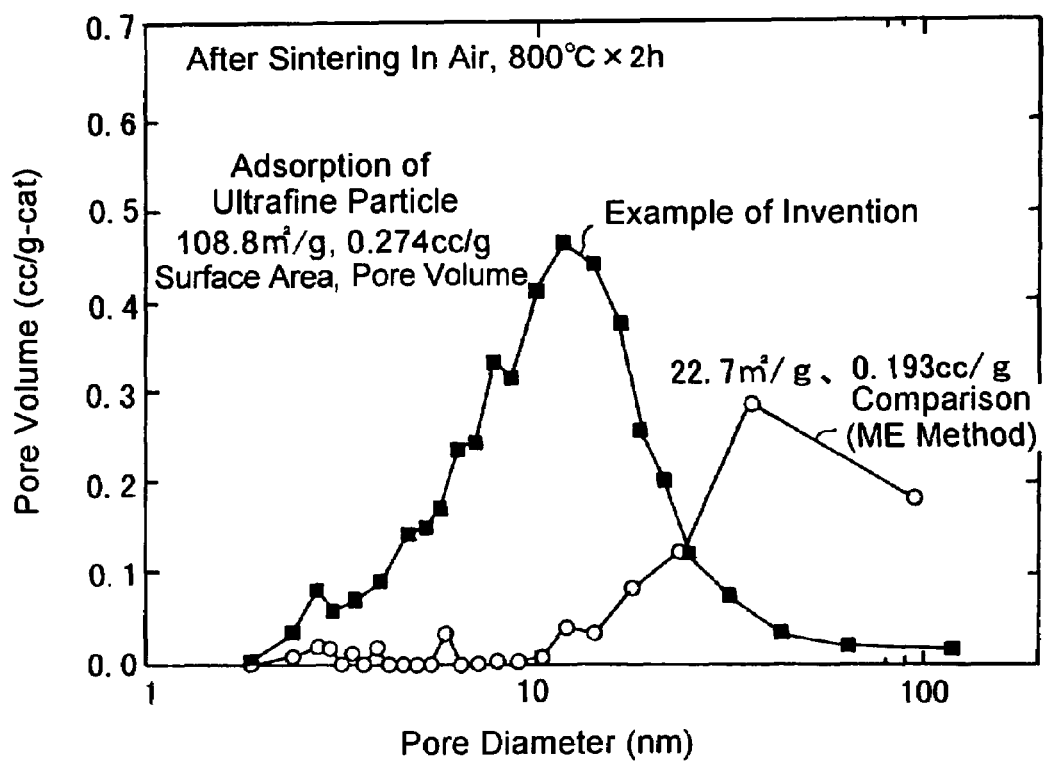
FIG. 6 is a graph plotting the measurement results of the pore distribution and the pore volume of the compound oxide obtained by the method of this invention.

On the other hand, the measurement results of the pore volume are plotted in FIG. 6. The measurement results plotted in FIG. 6 present the measured values of the compound oxide according to this invention and the compound oxide according to the microemulsion method, in which the carrier is synthesized by the hydrolysis in the inverse micelles in the presence of the ultrafine particles, after the compound oxides were sintered in the air at 800° C. for two hours. In the compound oxide (as indicated by solid squares) according to the invention, the pore diameter takes a distribution having a peak at about 10 nm. In the compound oxide (as indicated by blank circles) of a comparison according to the microemulsion method, on the contrary, the peak of the pore distribution is offset to about 40 nm. Moreover, the pore volume of the compound oxide according to the method this invention has a larger pore volume.

Figure 7:
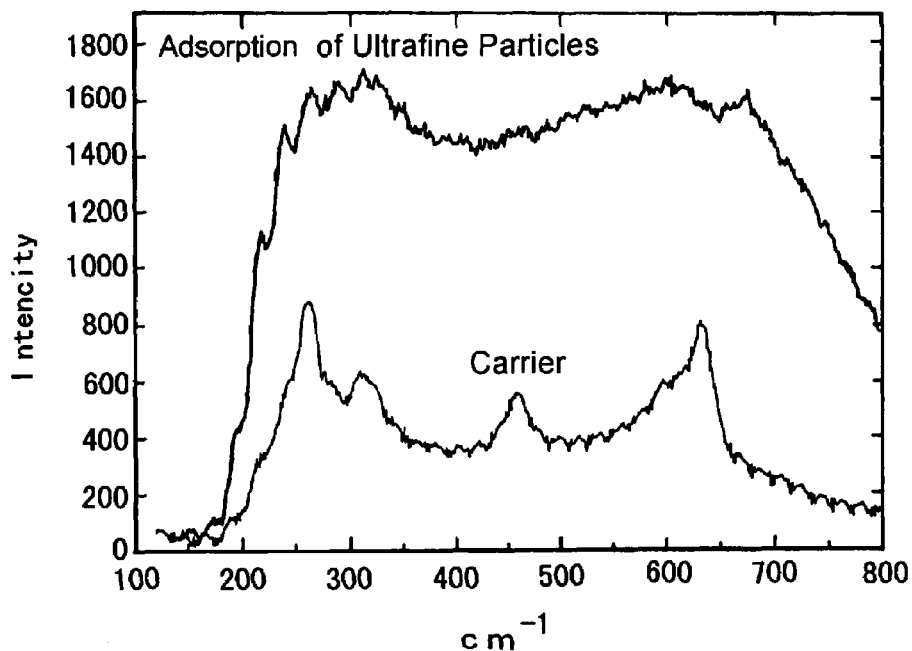
FIG. 7 is a graph plotting the results of the Raman spectroscopic analyses of the surface composition of the compound oxide obtained by the method of this invention.

FIG. 7 shows the measurement results of the surface compositions of the exhaust gas purifying catalyst obtained by the method of this invention, as measured by the Raman spectroscopic analyses. In FIG. 7, an abscissa indicates the wave number ($cm^{-1}$) of the shift of the Raman-scattered light, against an incident light, and an ordinate indicates the intensity of the spectrum. Against the spectral intensity of the carrier, the scattering intensity by the ultrafine particles such as $WO_3$ or $LaZrO_{3.5}$ carried by the carrier rises. From these measurement results, therefore, it is apparent that the ultrafine particles are carried homogeneously and densely by the surface of the carrier.

Figure 8:
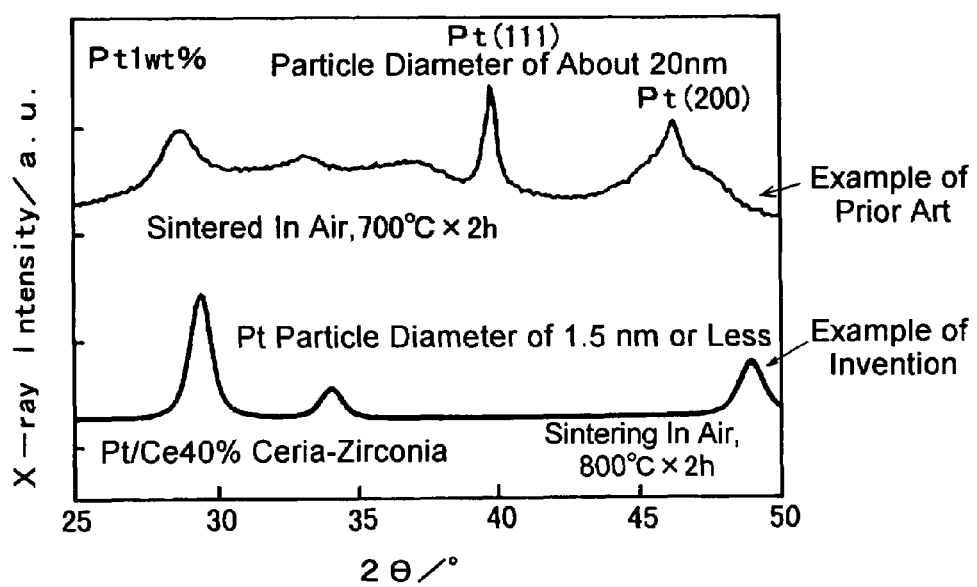
FIG. 8 is a graph plotting the measurement results of platinum particles after the compound oxide obtained by the method of this invention was sintered.

Moreover, the compound oxide according to the method of the invention can be used with particles of a precious metal such as platinum as a catalytic component. In this case, the compound oxide can suppress the sintering of the precious metal particles and can keep the activity of the same. The measurement results plotted in FIG. 8 are obtained by applying the method of this invention to lean ceria (containing Ce as a ceria-zirconia solid solution in 10% or less) for an NOx catalyst and by measuring the particle diameter of platinum by an X-ray diffraction. The abscissa indicates an diffraction angle x 2 (2θ), and the ordinate indicates the measured strength of the X-ray. As plotted in FIG. 8, the particle diameter of the platinum in the exhaust gas purifying catalyst (which carries the Pt in the ceria-zirconia solid solution) by the water-absorption carriage of a predetermined method of the prior art is enlarged to about 20 nm. In the exhaust gas purifying catalyst (or the compound oxide) according to the method of this invention, it is found that the particle diameter of the platinum is kept at about 1.5 nm thereby to suppress the sintering.

EXAMPLE 1

Example of $WO_3/ZrO_2$

First of all, liquids of the following three kinds (i.e., a microemulsion liquid for a carrier, an ultrafine particle solution and a zirconium alkoxide solution) were prepared.

At first, 570 litters of cyclohexane and 21 Kg of polyoxyethylene (n=5) nonylphenyl ether were mixed and sufficiently agitated in a reactor of 1,000 litters. To this mixture, there were added 12 litters of an aqueous solution, in which 13 mols of oxynitrate zirconium, 2.6 mols of aluminum nitrate and 17 mols of ammonium nitrate had been dissolved. The resultant solution was sufficiently agitated at the room temperature. As a result, the inverse micelles (i.e., the water-in-oil type microemulsion having a water droplet diameter of 30 nm) were formed to prepare the carrier microemulsion liquid.

Next, the ultrafine particle containing solution of a tungsten oxide ($WO_3$), which was commercially available or synthesized in advance, was prepared, and a zirconium alkoxide solution was prepared by dissolving 13 mols of zirconium-n-butoxide in 80 litters of cyclohexane.

Subsequently, a compound oxide precursor was synthesized by a hydrolytic reaction.

At first, the zirconium alkoxide solution and ammonia water were added, while being agitated, into the microemulsion liquid for synthesizing the carrier, thereby to adjust the pH value to "5", and the hydrolysis was started. After one minute, the fine particle solution was added to the mixed liquid of the carrier microemulsion liquid and the zirconium alkoxide solution, and was agitated. Under this condition, the $WO_3$ ultrafine particles were charged to the minus polarity, and the zirconia precursor surfaces formed by the hydrolysis were charged to the plus polarity, so that the $WO_3$ ultrafine particles were adsorbed for a short time period by the zirconia precursors. Next, 9.6 litters of water were added, and the liquid was aged, while being agitated, for about one hour.

The mother liquid was filtered, and the precipitate obtained was rinsed three times with ethanol, dried at 80° C. for one night, and then sintered in the atmosphere at 600° C. for two hours to obtain $WO_3/ZrO_2$.

EXAMPLE 2

Example of $WO_3$(18 wt. %)/$ZrO_2$

First of all, liquids of the following three kinds (i.e., a microemulsion liquid for a carrier, a zirconium alkoxide solution for carrier material, and a microemulsion emulsion liquid for ultrafine particles) were prepared.

At first, 570 litters of cyclohexane and 21 Kg of polyoxyethylene (n=5) nonylphenyl ether were mixed and sufficiently agitated in a reactor of 1,000 litters. To this mixture, there were added 12 litters of an aqueous solution, in which 13 mols of oxynitrate zirconium, 2.6 mols of aluminum nitrate and 17 mols of ammonium nitrate had been dissolved. The resultant solution was sufficiently agitated at the room temperature. As a result, the inverse micelles (i.e., the water-in-oil type microemulsion having a water droplet diameter of 30 nm) were formed to prepare the carrier microemulsion liquid.

Next, 8.5 litters of cyclohexane and 1.9 Kg of polyoxyethylene (n=5) nonylphenyl ether were mixed and sufficiently agitated in another reactor of 15 litters. To this mixture, there were added 680 milliliters of an aqueous solution, in which 2.6 mols of ammonium metatungstate had been dissolved as tungsten. The resultant solution was sufficiently agitated at the room temperature. As a result, inverse micelles (e.g., a water-in-oil type microemulsion having a water droplet diameter of 3 nm) were produced to prepare a microemulsion liquid for fine particles.

Separately of this, there was prepared a zirconium alkoxide solution, in which 13 mols of zirconium-n-butoxide was dissolved in 80 litters of cyclohexane.

Subsequently, a compound oxide precursor was synthesized by a hydrolytic reaction.

At first, the zirconium alkoxide solution and ammonia water were added, while being agitated, into the microemulsion liquid for synthesizing the carrier, thereby to adjust the pH value to 5.2, and the hydrolysis was started. At this time, excessive nitrate ions existed in the aqueous phase. After one minute, the microemulsion liquid for ultrafine particles was added to the mixed liquid of the carrier microemulsion liquid and the zirconium alkoxide solution, and was agitated to deposit the $WO_3$ ultrafine particle precursors in the presence of the nitrate ions. This was a reaction field for synthesizing zirconia procurers, and corresponded to the operation for precipitating the $WO_3$ ultrafine particle precursors. Under this condition, the precursor surfaces of the $WO_3$ ultrafine particles were charged to the minus polarity, and the zirconia precursor surfaces formed by the hydrolysis were charged to the plus polarity, so that the $WO_3$ ultrafine particle precursors were adsorbed just after the synthesization, i.e., for a short time period by the zirconia precursors. Next, 9.6 litters of water were added, and the liquid was aged, while being agitated, for about one hour.

The mother liquid was filtered, and the precipitate obtained was rinsed three times with ethanol, dried at 80° C. for one night, and then sintered in the atmosphere at 600° C. for two hours to obtain $WO_3$(18 wt. %)/$ZrO_2$.

EXAMPLE 3

Example of $La_{0.035}Ce_{0.4}Zr_{0.565}O_{1.9825}$(25 wt. %)/$Y_{0.1}Zr_{0.9}O_{1.95}$]

First of all, liquids of the following four kinds (i.e., a microemulsion liquid for a carrier, a microemulsion liquid for fine particles, a zirconium alkoxide solution, and a saturated pyromellitic solution) were prepared.

At first, 430 litters of cyclohexane and 16 Kg of polyoxyethylene (n=5) nonylphenyl ether were poured into a reactor of 1,000 litters and were agitated and mixed. To this mixture, there were added 12 litters of an aqueous solution, in which 2.6 mols of yttrium nitrate, 12 mols of oxynitrate zirconium, and 39 mols of ammonium nitrate had been dissolved. The resultant solution was sufficiently agitated at the room temperature. As a result, the inverse micelles (i.e., the water-in-oil type microemulsion having a water droplet diameter of 40 nm) were formed to prepare the carrier microemulsion liquid.

Next, 75 litters of cyclohexane and 17 Kg of polyoxyethylene (n=5) nonylphenyl ether were mixed and sufficiently agitated in another reactor of 150 litters. To this mixture, there were added 6 liters of an aqueous solution, in which 0.19 mols of lanthanum nitrate, 2.2 mols of cerium nitrate and 3.1 mols of zirconium oxynitrate had been dissolved. The resultant solution was sufficiently agitated at the room temperature. As a result, inverse micelles (e.g., a water-in-oil type microemulsion having a water droplet diameter of 5 nm) were produced to prepare a microemulsion liquid for fine particles.

Separately of this, there was prepared a zirconium alkoxide solution, in which 12 mols of zirconium-n-butoxide was dissolved in 80 litters of cyclohexane.

Moreover, a sufficient quantity of pyromellitic acid was dissolved, while being agitated, into hot water, and was cooled to the room temperature to prepare a saturated pyromellitic acid solution.

Next, a compound oxide precursor was synthesized by a hydrolytic reaction.

At first, the zirconium alkoxide solution and ammonia water were added, while being agitated, into the microemulsion liquid for synthesizing the carrier, thereby to adjust the pH value to 6.5, and the hydrolysis was started. After one minute, precursors of yttria-zirconia compound oxide were produced, and 6.7 litters of an aqueous solution of saturated pyromellitic acid and aqueous ammonium were added to that mixture solution thereby to adjust the pH value to 6.5. At this time, the pyromellitic acid was adsorbed by the surfaces of the yttria-zirconia compound oxide precursors to charge the surfaces to the minus polarity. This corresponded to the operation to adjust the potential by adsorbing an organic acid. Moreover, excessive ammonium ions existed in the aqueous phase. After one minute, moreover, the microemulsion liquid for ultrafine particles was added, while being agitated, to the mixed liquid of the carrier microemulsion liquid and the zirconium alkoxide solution thereby to deposit the $La_{0.035}Ce_{0.4}Zr_{0.565}O_{1.9825}$ ultrafine particle precursors by a neutralization reaction with the ammonium ions. Under this condition, the precursor surfaces of the $La_{0.035}Ce_{0.4}Zr_{0.565}O_{1.9825}$ ultrafine particles were charged to the plus polarity, and the yttria-zirconia compound oxide precursor surfaces formed by the hydrolysis were charged to the minus polarity, so that the $La_{0.035}Ce_{0.4}Zr_{0.565}O_{1.9825}$ fine particle precursors were adsorbed by the yttria-zirconia compound oxide precursors. Next, 14 litters of water were added, and the liquid was aged, while being agitated, for about one hour.

The mother liquid was filtered, and the precipitate obtained was rinsed three times with ethanol, dried at 80° C. for one night, and then sintered in the atmosphere at 600° C. for two hours to obtain $La_{0.035}Ce_{0.4}Zr_{0.565}O_{1.9825}$(25 wt. %)/$Y_{0.1}Zr_{0.9}O_{1.95}$.

COMPARISON 1

In contrast to Examples 1 and 2, here is described a method for synthesizing $WO_3/ZrO_2$ carrying 18 wt. % (or 10 molar %) of $WO_3$ by the method of the prior art.

First of all, zirconia to become a base carrier was synthesized by the so-called pH swing neutralization precipitation method. At first, a precursor precipitate was obtained by adding ammonia to a 1M aqueous solution of zirconium nitrate to set the pH value at "8". Next, the pH value of the precursor was adjusted to "6.5" by adding nitric acid to the precursor, and this adjusted precursor was agitated for one week. After this, ammonia was added again to return the pH value to "8" thereby to prepare the precipitate. This precipitate was rinsed, dried and sintered at 600° C. by the conventional procedure thereby to produce a zirconia carrier having pores.

Next, in order that an aqueous solution of ammonium metatungstate might be absorbed by the pores to produce 18 wt. % of $WO_3$, the aforementioned zirconia carrier was dipped and agitated in advance in distilled water and was absorbed by the pores, and the quantity of water supplied to the pores was measured from the weight increase.

Next, this water supply was used to decide the density of the aqueous solution of ammonium metatungstate, and the aforementioned zirconia carrier was dipped and agitated in that aqueous solution. After filtered and dried, the zirconia carrier was sintered at 600° C. for two hours to produce $WO_3/ZrO_2$ carrying 18 wt. % of $WO_3$.

Figure 9:
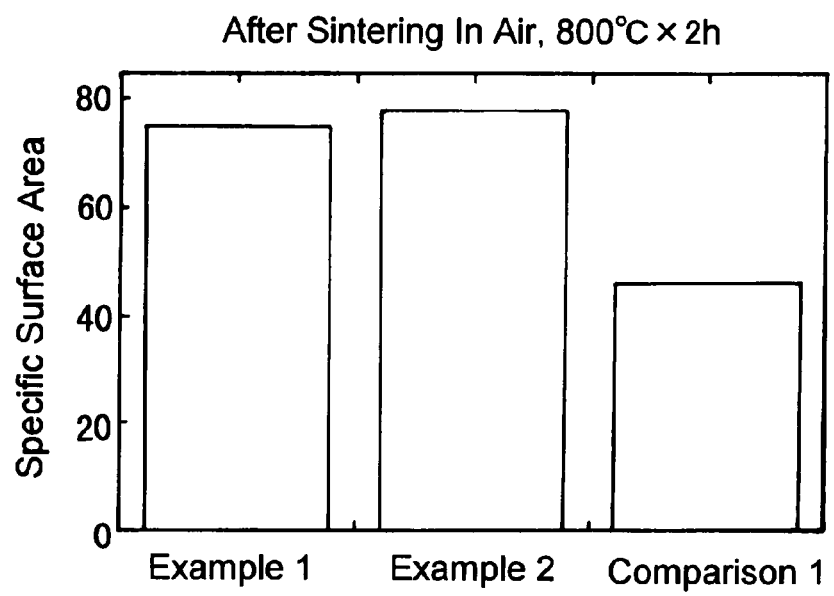
FIG. 9 is a diagram showing the measurement results of the surface areas of $WO_3/ZrO_2$ in Example 1, Example 2 and Comparison 1.
Figure 10:
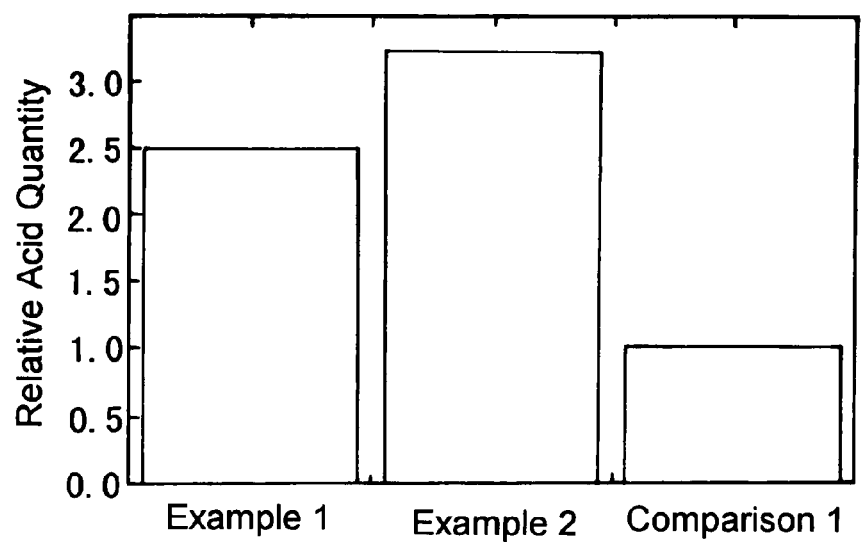
FIG. 10 is a diagram showing the measurement results of the relative acid quantities of $WO_3/ZrO_2$ in Example 1, Example 2 and Comparison 1.

Next, the superiorities of Examples 1 and 2 are described in contrast to Comparison 1. FIG. 9 shows the surface area of $WO_3/ZrO_2$ carrier, and FIG. 10 shows solid acid amount. At first, in FIG. 9, Examples 1 and 2 had larger surface areas and higher heat resistances after the sintering at 800° C. than those of Comparison 1. On the other hand, FIG. 10 shows the solid acid amount determined from the ammonia adsorptions, in relative values. The acid quantities were more different than the aforementioned surface areas shown in FIG. 9. Of Examples 1 and 2 of this invention, Example 2 had a much more acid quantity. These results indicate that the adsorption of the $WO_3$ ultrafine particles in the carrier not only improves the heat resistance but also have a higher disperse of $WO_3$ than that of Comparison 1.

COMPARISON 2

In contrast to Example 3, the neutralization precipitation method of the prior art was used to synthesize $La_{0.035}Ce_{0.4}Zr_{0.565}O_{1.9825}$(25 wt. %)/$Y_{0.1}Zr_{0.9}O_{1.95}$.

Like the aforementioned comparison 1, the zirconia used to become the base carrier was synthesized by the so-called pH swing neutralization precipitation method, and an aqueous solution of yttrium nitrate was absorbed and carried in the base carrier, and was dried and sintered at 600° C. for two hours to produce $Y_{0.1}Zr_{0.9}O_{1.95}$.

Next, this carrier was made to absorb an aqueous solution, in which aqueous solutions of lanthanum nitrate, cerium nitrate and zirconium oxynitrate had been mixed at ratios of $La_{0.035}Ce_{0.4}Zr_{0.565}$. The carrier thus made was dried and sintered at 600° C. for two hours to produce a compound oxide having a composition of $La_{0.035}Ce_{0.4}Zr_{0.565}O_{1.9825}$(25 wt. %)/$Y_{0.1}Zr_{0.9}O_{1.95}$.

Figure 11:
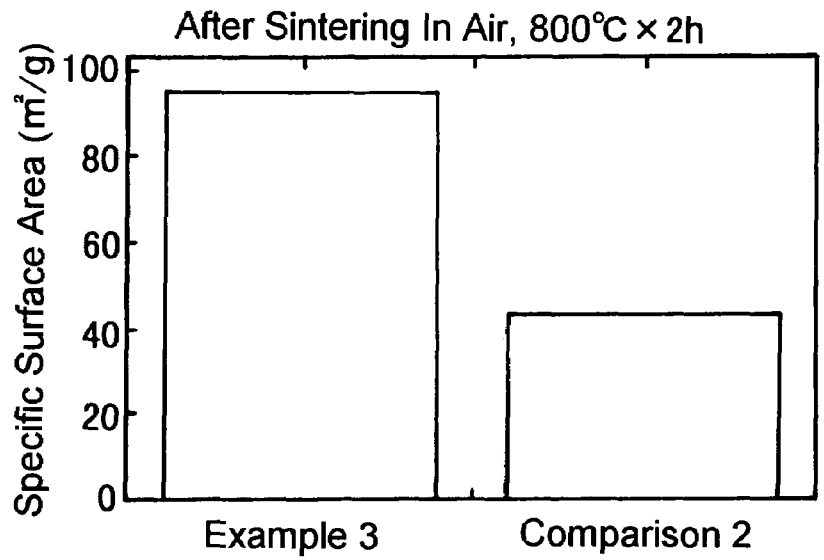
FIG. 11 is a diagram showing the measurement results of the surface areas of a carrier $La_{0.035}Ce_{0.4}Zr_{0.565}O_{1.9825}(25$ wt %$)/Y_{0.1}Zr_{0.9}O_{1.95}$ in Example 3 and Comparison 2.
Figure 12:
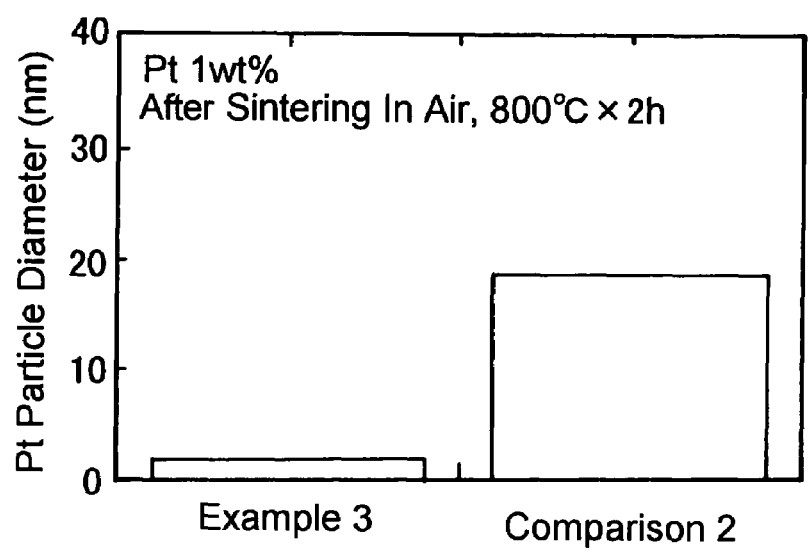
FIG. 12 is a diagram showing the measurement results of the Pt particle diameters on a carrier $La_{0.035}Ce_{0.4}Zr_{0.565}O_{1.9825}(25$ wt %$)/Y_{0.1}Zr_{0.9}O_{1.95}$ in Example 3 and Comparison 2.

Next, the superiority of Example 3 is described in contrast to Comparison 2. FIG. 11 shows the carrier surface areas at the time of sintering at 800° C. Example 3 had a specific surface area larger by twice or more than that of Comparison 2 so that it had an apparent heat-resistance improving effect. This effect is estimated at first from that, in Comparison 2, nitrate adhered to the $Y_{0.1}Zr_{0.9}O_{1.95}$ carrier so that the solid phase reaction was promoted at the drying and sintering time to make the surface area smaller, whereas, in Example 3, not the nitrate but ultrafine particles of $La_{0.035}Ce_{0.4}Zr_{0.565}O_{1.9825}$ were adsorbed by the $Y_{0.1}Zr_{0.9}O_{1.95}$ so that the solid phase reaction was minimized.

On the other hand, the Pt particle diameter at the time when those carriers had been caused to carry 1 wt. % of Pt and sintered in the air at 800° C. for two hours was measured by the X-ray diffraction method. The results are shown in FIG.

12. In Example 3, the Pt particles were the lower measurement limit of about 2 nm, whereas, in Comparison 3, the Pt particles were sintered to become coarser to 18 nm.

This difference arose depending on whether or not Ce had suppressed the sintering of the Pt particles, although the interaction between Ce and Pt was basically so strong as to suppress the migration of the Pt particles. In Comparison 2, specifically, the solid phase reaction of the nitrate with the base carrier at the sintering time was so high but not the charge composition that the surface Ce concentration dropped. In Example 3, on the other hand, it is estimated that the Ce was adsorbed as the ultrafine particles so that the solid phase reaction at the sintering time was minimized to keep the surface Ce concentration thereby to cause the sintering suppression of the Pt particles.

The invention claimed is:

1. A method for producing a heat-resisting compound oxide, comprising:
    synthesizing first oxide particles or their precursor particles in micelles in a microemulsion;
    charging said first oxide particles or their precursor particles to a potential inverse to that of second oxide particles or their precursor particles, wherein said second oxide particles or their precursor particles have a smaller diameter than said first oxide particles or their precursor particles;
    absorbing said second oxide particles or their precursor particles onto said first oxide particles or their precursor particles; and
    sintering said first oxide particles or their precursor particles and said second oxide particles or their precursor particles;
    wherein the method results in said second oxide particles being carried on said first oxide particles;
    wherein the obtained surface area is enlarged by the second oxide particles blocking or suppressing the sintering of the first oxide particles.

2. The method for producing a heat-resisting compound oxide as set forth in claim 1, further comprising:
    mixing a solution containing said second particles or their precursor particles with said microemulsion so that said first oxide particles are caused to adsorb said second particles.

3. The method for producing a heat-resisting compound oxide as set forth in claim 2, wherein:
    the pH value of an environment in which said first oxide particles or their precursor particles and said second particles or their precursor particles are mixed is adjusted to charge said first oxide particles or their precursor particles and said second particles or their precursor particles to potentials inverse to each other.

4. The method for producing a heat-resisting compound oxide as set forth in claim 2, wherein:
    either said first oxide particles or their precursor particles, or said second particles or their precursor particles, are caused to adsorb an acid or a base so that said first oxide particles or their precursor particles and said second particles or their precursor particles are charged to potentials inverse to each other.

5. The method for producing a heat-resisting compound oxide as set forth in claim 1, further comprising:
    synthesizing said second particles or their precursor particles in a reaction field for synthesizing said first oxide particles or their precursor particles; and
    charging said second particles to a potential inverse to that of said first oxide particles or their precursor particles so that said first oxide particles are caused to adsorb said second particles.

6. The method for producing a heat-resisting compound oxide as set forth in claim 5, wherein:
    the pH value of environment in which said second particles are synthesized is adjusted to charge said first oxide particles or their precursor particles and said second particles or their precursor particles to potentials inverse to each other.

7. The method for producing a heat-resisting compound oxide as set forth in claim 5, wherein:
    either said first oxide particles or their precursor particles, or said second particles or their precursor particles, are caused to adsorb an acid or a base so that said first oxide particles or their precursor particles and said second particles or their precursor particles are charged to potentials inverse to each other.

8. The method for producing a heat-resisting compound oxide as set forth in claim 1, wherein:
    the pH value of either an environment in which said first oxide particles or their precursor particles and said second particles or their precursor particles are mixed, or an environment in which said second particles are synthesized, is adjusted to charge said first oxide particles or their precursor particles and said second particles or their precursor particles to potentials inverse to each other.

9. The method for producing a heat-resisting compound oxide as set forth in claim 1, wherein:
    either said first oxide particles or their precursor particles, or said second particles or their precursor particles, are caused to adsorb an acid or a base so that said first oxide particles or their precursor particles and said second particles or their precursor particles are charged to potentials inverse to each other.

* * * * *